United States Patent
Negishi

(10) Patent No.: US 11,377,056 B2
(45) Date of Patent: Jul. 5, 2022

(54) IN-VEHICLE SYSTEM

(71) Applicant: DENSO CORPORATION, Kariya (JP)

(72) Inventor: Kazuya Negishi, Kariya (JP)

(73) Assignee: DENSO CORPORATION, Kariya (JP)

( * ) Notice: Subject to any disclaimer, the term of this patent is extended or adjusted under 35 U.S.C. 154(b) by 451 days.

(21) Appl. No.: 16/573,122

(22) Filed: Sep. 17, 2019

(65) Prior Publication Data

US 2020/0156579 A1 May 21, 2020

(30) Foreign Application Priority Data

Nov. 15, 2018 (JP) .............................. JP2018-214813

(51) Int. Cl.
- B60R 21/01 (2006.01)
- G06F 8/61 (2018.01)
- G06F 9/50 (2006.01)

(52) U.S. Cl.
CPC ................ B60R 21/01 (2013.01); G06F 8/61 (2013.01); *B60R 2021/0104* (2013.01); *G06F 9/5005* (2013.01)

(58) Field of Classification Search
CPC .................................. B60R 21/01; G06F 8/61
USPC ....................................................... 340/425.5
See application file for complete search history.

(56) References Cited

U.S. PATENT DOCUMENTS

| | | |
|---|---|---|
| 2008/0141283 A1 | 6/2008 | Minemura et al. |
| 2016/0239286 A1* | 8/2016 | Tanaka ....................... G06F 8/61 |
| 2017/0277566 A1* | 9/2017 | Okamoto ................ H04L 67/12 |
| 2018/0196660 A1* | 7/2018 | Rivas Silva ............ H04L 63/08 |
| 2018/0227120 A1* | 8/2018 | Takemori ............... H04L 9/0894 |

FOREIGN PATENT DOCUMENTS

| | | |
|---|---|---|
| JP | H06-12348 A | 1/1994 |
| JP | 2014-178998 A | 9/2014 |
| JP | 2016-071527 A | 5/2016 |
| JP | 6435925 B2 | 12/2018 |

* cited by examiner

*Primary Examiner* — Kerri L McNally
(74) *Attorney, Agent, or Firm* — Posz Law Group, PLC

(57) ABSTRACT

An in-vehicle system for a vehicle includes: a plurality of information processors that install an application; an application acquisition unit that acquires the application; a request specifying unit that specifies a request resource required by the application acquired by the application acquisition unit; a resource specifying unit that specifies a provision resource that is provided by each of the information processors; and a selection unit that selects one of the information processors which provides the provision resource satisfying the request resource as an installation destination of the application.

4 Claims, 5 Drawing Sheets

IN-VEHICLE SYSTEM

CROSS REFERENCE TO RELATED APPLICATION

The present application claims the benefit of priority from Japanese Patent Application No. 2018-214813 filed on Nov. 15, 2018. The entire disclosure of the above application is incorporated herein by reference.

TECHNICAL FIELD

The present disclosure relates to an in-vehicle system for additionally installing an application on an electronic control unit in the in-vehicle system.

BACKGROUND

An installation system includes a plurality of information processing units and additionally installs a program. In the program, a specific information processing unit included in the installation system is set in advance as an installation target. The installation system of Patent Literature 1 installs a program on a specific information processing unit determined as an installation target based on an operation on a certain information processing unit included in the installation system.

SUMMARY

According to a conceivable example, an in-vehicle system for a vehicle includes: a plurality of information processors that installs an application; an application acquisition unit that acquires an application; a request specifying unit that specifies a request resource required by the application acquired by the application acquisition unit; a resource specifying unit that specifies a provision resource provided by each information processor; and a selection unit that selects one of the information processors, which has the provision resource matching the request resource, as an installation destination of the application.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

In an in-vehicle system which is a system including a plurality of information processing units, a configuration is studied in which an application is additionally installed. However, the resource available to individual information processing unit included in the in-vehicle system may vary with the vehicle according to the configuration and the usage situation of the vehicle. Therefore, in a case of the configuration where the application is installed in a specific information processing unit included in the in-vehicle system, the resource available for the application may be limited by the provision resource that can be provided by the specific information processing unit as the installation target. Therefore, the performance of the installed application may be degraded.

An in-vehicle system is provided with suppressing performance degradation of an additionally installed application.

According to an example embodiment, an in-vehicle system for a vehicle includes: a plurality of information processors that installs an application; an application acquisition unit that acquires an application; a request specifying unit that specifies a request resource required by the application acquired by the application acquisition unit; a resource specifying unit that specifies a provision resource provided by each information processor; and a selection unit that selects one of the information processors, which has the provision resource matching the request resource, as an installation destination of the application.

According to the above configuration, the request specifying unit and the resource specifying unit specify the request resource required by an additional application and the provision resource that is provided by each information processor. The selection unit selects, as the installation target of the additional application, one of the information processors in which the provision resource matches the request resource among the plurality of information processors. Therefore, a selected information processor provides the request resource to the application installed in the selected information processor so that the application is operable. Therefore, the in-vehicle system suppresses the performance degradation of the added application.

Figure 1:
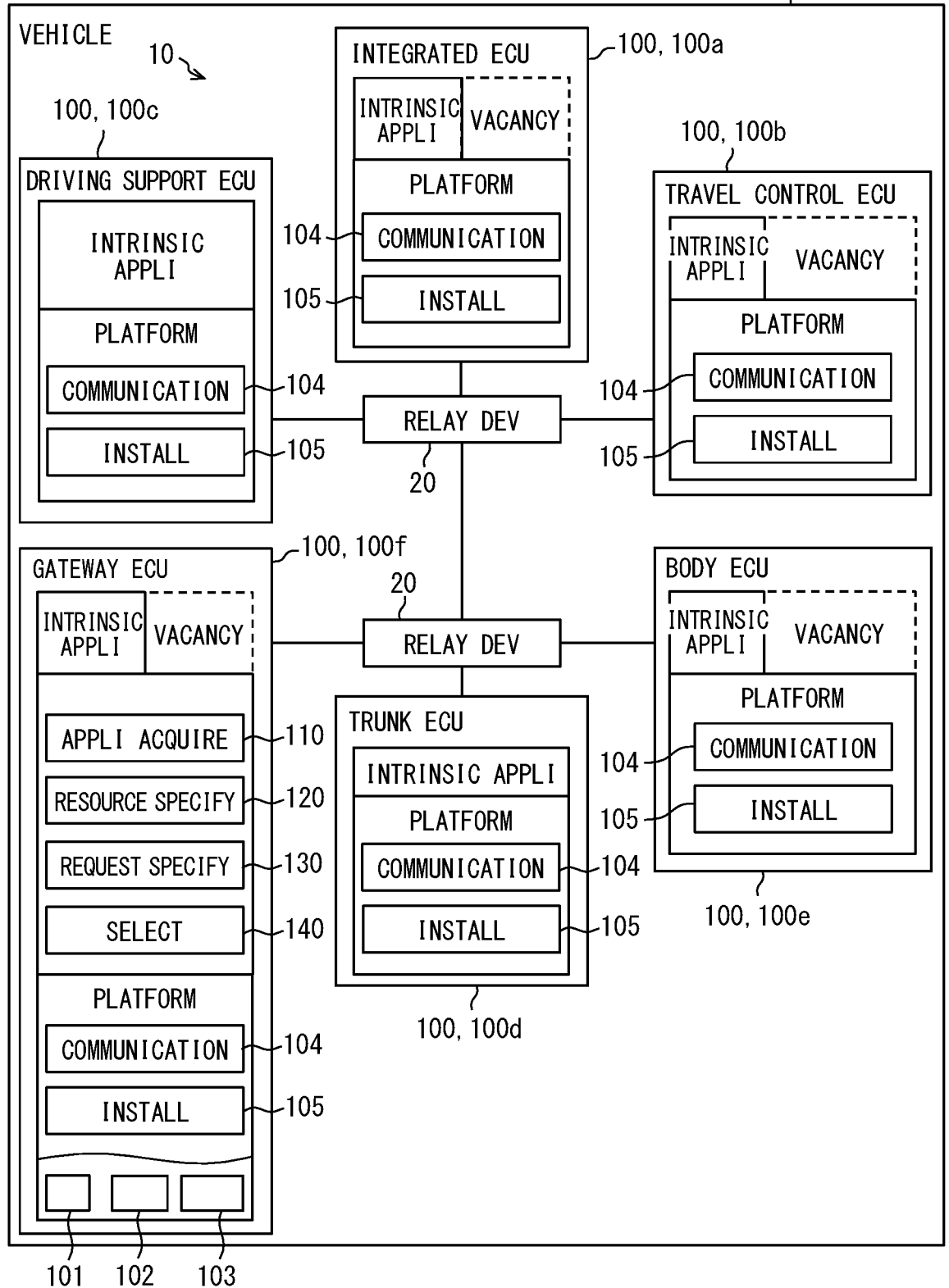
FIG. 1 is a block diagram showing the configuration of an in-vehicle system.

An in-vehicle system 10 according to an embodiment of the present disclosure is a system constructed to include a plurality of ECUs 100 mounted on a vehicle 1, as shown in FIG. 1. The in-vehicle system 10 is used as a control system that integrally controls various sensors, actuators, user interfaces, and the like provided in the vehicle 1. The in-vehicle system 10 includes a relay device 20 in addition to the plurality of ECUs 100 described above.

The relay device 20 is a device that relays communication between the ECUs 100 and functions as a so-called switching hub. The relay device 20 is provided with a plurality of ports for connecting to the ECUs 100 and other relay devices 20. Each of the ports is connected to any one of the ECU 100 and other relay devices 20 by a communication cable such as a twisted pair cable. That is, the relay device 20 connects the respective ECU 100 so as to form a star-type network configuration around the relay device 20 as a center.

The relay device 20 relays communication based on the fixed address set in each of the ECUs 100 and the relay device 20. The fixed address is, for example, an IP address or the like which does not change in general and is uniquely assigned in a manner that each device in the in-vehicle system 10 is identifiable. The relay device 20 relays communication according to, for example, a communication protocol of Ethernet (registered trademark).

Each ECU 100 is an electronic control unit mainly including a microcomputer with, for example, a storage device for storing software, a processor 101 for executing software, and an input/output interface. The storage device is provided by, for example, a semiconductor storage device. Each ECU 100 has a main storage device (hereinafter, a memory) and an auxiliary storage device (hereinafter, a storage) as storage devices. The memory 102 temporarily stores software being executed and data related thereto. The storage 103 is a non-transitory, tangible storage medium that non-temporarily stores software including not-executed software and data.

Each of the ECUs 100 reads out the software stored in the storage 103 into the memory 102, and controls the processor 101 to execute the software, thereby performing a function corresponding to the software. In the storage 103 of each ECU 100, application software (hereinafter, application) different for each ECU 100, and platform software (hereinafter, platform) common to each ECU 100 are stored in advance. An application is software that is executed on the platform software. The application stored in advance in the storage 103 of each ECU 100 includes a unique application. The unique application provides a unique function to the ECU 100 by processing in cooperation with a unique sensor or actuator connected to the input/output interface of the ECU 100.

The platform is software for providing an application execution environment. The platform indicates an operating system (hereinafter referred to as OS) or a combination of the OS and middleware.

The OS is software that provides basic functions such as various kinds of calculation process to the middleware and the application, and executes the middleware and the application. The middleware is software that is executed on the OS and extends functions provided from the OS to applications. The middleware provides a general-purpose extended function to the application, the function such as a communication function in which a series of calculation processes related to communication with another ECU 100 is packaged, for example. That is, the platform may be software that defines a set of functions that can be provided to an application. By executing a common platform in each of the ECUs 100, the types of functions that can be provided to the application are standardized among the respective ECUs 100.

The common platform executed by each of the ECUs 100 provides functions as the installation unit 105 and the communication unit 104. The installation unit 104 stores the received installation file of the application in the storage 103, and opens the installation file to install the application in the installation unit 104.

The communication unit 105 provides communication in accordance with a service-oriented communication protocol. Specifications defined in SOME/IP (Scalable Service-Oriented Middleware on Ethernet/IP) or DDS (Data Distribution Service for Real-time Systems) is available in the service oriented communication protocol, for example. The service indicates one component unit of a process in the application in which an interface capable of calling and responding to each other is preliminarily defined in a communication protocol.

The service includes a distribution service and a reception service. The distribution service is a service that delivers data as a result of processing of the application periodically or when a predetermined event occurs. The reception service is a service that receives a command and executes a process of an application corresponding to the command. In the in-vehicle system 10, for example, a service for periodically distributing data indicating a vehicle speed, a service for distributing data for notifying occurrence of a shift operation event by a user, and the like are defined as the distribution service. Further, as the reception service, for example, a service for receiving an unlocking command and a locking command for a door of a seat or a trunk room etc. are defined.

The ECUs 100 executing the common platform notify each other of a set of the service provided by the ECU 100 and the fixed address at a predetermined timing. When the application requests for receiving the notified distribution service, each ECU 100 sends a subscription request and its own fixed address in response to the fixed address of the notification source. The distribution service that has received the subscription request provides the distribution service to the fixed address that has returned the subscription request.

Each of the ECUs 100 stores a set of the notified reception service and the fixed address when the application requests the usage of the notified reception service. When the application requests the usage of the reception service, each ECU 100 performs communication by reading the service as the fixed address according to the stored set. As a result, the application executed by each ECU can specify the communication partner according to the type of service, even when the fixed address of the ECU 100 as the communication partner is not specified in advance.

Thus, in any of the ECUs 100 of the present embodiment, the common basic functions and extended functions are provided to the application, and the application can cooperate with any service provided in the in-vehicle system 10. Therefore, even when an application is installed on any of these ECUs 100, the installed application can be ideally normally executed. Therefore, each of these ECUs 100 corresponds to an "information processing unit" capable of additionally installing an application. Here, the method of establishing a system by linking the function of each ECU100 using the service oriented communication protocol described above may be defined a service oriented architecture.

The in-vehicle system 10 of the present embodiment includes, as the above-described ECU 100, an integrated ECU 100*a*, a traveling control ECU 100*b*, a driving support ECU 100*c*, a trunk ECU 100*d*, a body ECU 100*e*, and a gateway ECU 100*f*.

The integrated ECU 100*a* is a device that exerts a function of controlling the state of the vehicle 1 in an integrated manner by executing the specific application.

The integrated ECU 100*a* cooperates with, for example, a wheel speed sensor, an acceleration sensor, a GNSS locator, etc., and exerts a function of sequentially acquiring the vehicle speed, the acceleration, the position, etc. of the vehicle 1. The integrated ECU 100*a* provides a distribution service that periodically notifies each of the acquired vehicle speed, acceleration, position, and the like.

The travel control ECU 100*b* is a device that exerts the function of controlling the travel of the vehicle 1 by executing the specific application. The travel control ECU 100*b* cooperates with an accelerator position sensor, a brake depression force sensor, a steering angle sensor, and the like to acquire a driving operation by the user. The travel control ECU 100*b* cooperates with an electronic throttle, a brake actuator, an EPS (Electric Power Steering) motor, and the like to execute acceleration/deceleration and steering according to the acquired driving operation. The travelling control ECU 100*b* provides a reception service for receiving a command for requesting acceleration or deceleration or steering.

The traveling control ECU 100*b* corrects and executes the amount of acceleration/deceleration and the amount of steering determined according to the driving operation by the user based on, for example, the received command.

The driving support ECU 100c is a device that exerts a driving support function for users such as lane keeping assist, adaptive cruise control, or so-called autonomous driving by executing the specific application. When the condition for executing the driving support is satisfied, the driving support ECU 100c recognizes the peripheral state of the vehicle 1 in cooperation with a peripheral monitoring device that monitors the peripheral state of the vehicle 1, such as a camera, a sonar, or a rider. The driving support ECU 100c generates a command for requesting acceleration/deceleration or steering according to the recognized peripheral situation, the vehicle speed, the acceleration, and the position obtained from the integrated ECU 100a, and the like, and transmits the command to the ECU 100 providing the reception service corresponding to the command.

The trunk ECU 100d is a device that controls the open and close of the trunk room of the vehicle 1 by executing the specific application. The trunk ECU 100d cooperates with a door lock motor that drives a door lock of the trunk room, and exerts a function of unlocking and locking the trunk room. The trunk ECU 100d provides a reception service for receiving a lock and unlock command of the trunk room.

The body ECU 100e is a device that exerts a control function of equipment provided on the vehicle body such as a door lock arranged on the door of the vehicle 1 by executing the specific application. The body ECU 100e cooperates with a wireless communication device capable of communicating with an electronic key disposed in the vehicle compartment or outside the vehicle, buttons arranged at various places in the vehicle body, and the like, and detects an operation request for equipment from the user and approves the operation request. The body ECU 100e generates a lock command, an unlock command and the like corresponding to the approved operation request, and transmits the command to the ECU 100 that provides a reception service corresponding to the command.

The body ECU 100e is connected to the same relay device 20 as the ECU 100 having high functional relevance, and forms a group with the relay device 20 as a center. Specifically, the body ECU 100e is connected to the same relay device 20 as the trunk ECU 100d.

The gateway ECU 100f is a device that exerts a connection function with the external device outside the in-vehicle system 10 by executing the specific application. The gateway ECU 100f cooperates with, for example, a wireless communication device, and exerts a function of connecting to a server or the like arranged in a data center by communication via a wireless base station and a public communication network. The gateway ECU 100f provides, for example, a reception service for receiving a message to the outside of the in-vehicle system 10 and a transmission command to the outside. The gateway ECU 100f also provides a distribution service for notifying the occurrence of a message reception event from the outside and transferring the message.

An installation assignment application is stored in the storage 103 of the gateway ECU 100f. The gateway ECU 100f exerts the functions as the application acquisition unit 110, the request specifying unit 130, the resource specifying unit 120, and the selection unit 140 by execution of the installation assignment application. Here, a part or all of the functions exerted by the gateway ECU 100f by executing the installation assignment application may be realized by hardware such as a logic circuit or the like using one or more ICs.

The application acquisition unit 110 acquires an additional application to be additionally installed in any of the ECUs 100 included in the in-vehicle system 10 from the outside of the in-vehicle system 10. The application acquisition unit 110 acquires the installation file of the additional application from the server device, for example, using the communication function of the gateway ECU 100f.

The resource specifying unit 120 specifies the provision resource indicating a resource that can be provided by each ECU 100. The resource indicates a hardware resource assigned to the application in each ECU 100. The resource may be represented by, for example, the spare time of the processor 101, the spare capacity of the memory 102, the spare capacity of the storage 103, the time during which the network can be accessed, and the service that can be communicated.

The resource specifying unit 120 collects resource information at a predetermined timing by communication with each ECU 100. The resource information is data that enables calculation of provision resource. For example, the utilization rate of the processor 101 (so-called CPU utilization rate), the utilization rate of the memory 102, the clock frequency, the free space of the storage 103, the network utilization rate, and the number of provided services and the number of used services can be used as resource information. The resource specifying unit 120 specifies the provision resource based on the collected resource information.

The resource specifying unit 120 of the present embodiment distinguishes the operating state of the vehicle 1 into the three states of the traveling state, the stopping state, and the parking state, and specifies the provision resource of each ECU 100 for each operating state. Further, when the operating state of the vehicle 1 is in the traveling state, the resource specifying unit 120 waits for collection of resource information until the operating state is in the stopping state. The traveling state is a state in which the vehicle 1 is traveling. The traveling state is set, for example, as a state in which the vehicle speed is equal to or higher than a predetermined traveling speed threshold such as 1 km hour or more.

The stopping state indicates that the vehicle 1 has stopped traveling and the user is staying in the vehicle. The vehicle stopping state is set, for example, as a state in which the vehicle speed is less than the traveling speed threshold and accessory power supply turns on or an ignition switch turns on. In the stopping state, the load on each ECU 100 and the network due to the specific application and the communication relating to the traveling condition tends to decrease, compared with the traveling state. Therefore, in the stopping state, the provision resource of each ECU 100 tends to increase, as compared with the traveling state.

The parking state is a state in which the vehicle stops traveling and the user can leave the vehicle. The parking state is set, for example, as a state in which the power source of the vehicle 1 including the accessory power supply turns off. In the parking state, a part of the ECU 100 included in the in-vehicle system 10 is in a power-off state where the electric power is not supplied. As a result, in some of the ECUs 100, the provision resource becomes zero because of the power-off state. For example, the ECU 100 relating to the traveling condition such as the driving support ECU 100c and the traveling control ECU 100b is in a state where the provision resource is zero because of the power-off state. Further, in the parking state, there may exist the ECU 100 in the power saving state in which the electric power consumption is reduced, compared with the traveling state and the stopping state. Therefore, in the parking state, the provision resource tends to be more restricted than the stopping state.

The request specifying unit 130 specifies a request resource that is a resource requested by the additional application acquired by the application acquisition unit 110. The request specifying unit 130 specifies the request resource, for example, by reading information for specifying an execution environment of the application attached to the installation file of the additional application. The information for specifying the execution environment includes, for example, the operating state of the vehicle 1 assumed to be executed, the clock frequency of the processor 101, the utilization rate of the processor 101 and the memory 102 when executed, the free space of the storage 103 required for installation, the usage rate of the network and the like which are set in advance.

The setting of the request resource will be described by taking the case where the home delivery trunk application is acquired as an additional application as an example. The home delivery trunk application is an application for using the trunk room of the vehicle 1 parked at home as a delivery box, that is, a reception space for delivered package. The home delivery trunk application receives the home delivery trunk request command from the outside of the vehicle by being executed by the ECU 100, and exerts a function of controlling the door lock of the trunk room.

The home delivery trunk application is an application that is executed when the vehicle 1 is in a parking state. Therefore, the request resource in the parking state is set in the request resource information of the home delivery trunk application. Specifically, utilization rates of the processor 101 and the memory 102 in the parking state are set as request resource information. In addition, in the parking state, the request resource information is set such that the installation destination is the ECU 100 provided with communication to the reception service of unlocking and locking commands of the trunk room.

The selection unit 140 selects the ECU 100 as the installation destination of the application acquired by application acquisition unit 110. The selection unit 140 selects, from among the ECUs 100, one of the ECUs 100 which has the provision resource satisfying the request resource as an installation destination of the application. The selection unit 140 selects an installation destination based on the provision resource, in which the additional application is in the operating state, selected among the provision resources specified by the resource specifying unit 120. That is, the provision resource corresponding to the operating state in which the additional application operates selects the ECU 100 that satisfies the request resource.

When there are a plurality of ECUs 100 that satisfy the request resource, the selection unit 140 selects an installation destination based on a preset selection guideline. For example, the selection unit 140 preferentially selects the ECU 100 with the lowest usage rate of the processor 101 or the memory 102 or the ECU 100 with a large storage capacity of the storage 103. Alternatively, the selection unit 140 may prioritize the ECU 100 located in the area close to the ECU 100, which provides the service utilized by the additional application, on the network. That is, priority may be given to the ECU 100 with fewer relay devices 20 through which communication is performed. The selection unit 140 transfers the installation file acquired by the application acquisition unit 110 to the ECU 100 selected as the installation destination. In addition, the selection unit 140 notifies the server device of the success or failure of the installation of the additional application.

[Activation of Installation Assignment Application]

Figure 2:
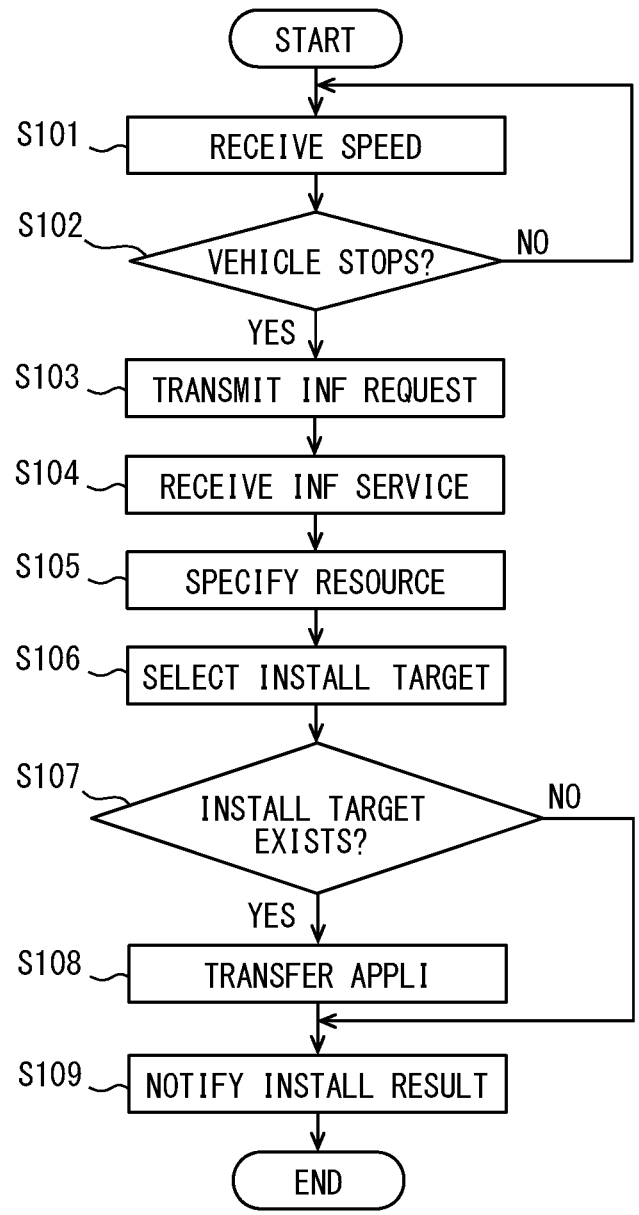
FIG. 2 is a flowchart showing an operation example of an installation assignment application.

An operation example of the installation assignment application will be described with reference to FIGS. 2 and 3. The installation assignment application executed by the gateway ECU 100f executes the process shown in the flowchart of FIG. 2 from S101 when the additional application is distributed from the server device.

In S101, the vehicle speed transmitted from integrated ECU 100a is received. In S102, based on the vehicle speed received in S101, it is determined whether the vehicle 1 stops. When the vehicle 1 stops, the process proceeds to S103, and when the vehicle 1 does not stop, the process returns to S101.

In S103, transmission of resource information is requested to each ECU 100. In S104, the resource information transmitted from each ECU is received.

In S105, while specifying the provision resource of each ECU 100 based on the resource information received in S104, the request resource of the additional application is specified. In S106, the ECU 100 as the installation destination is selected from the ECUs 100 that are provision resources and satisfy the request resource.

In S107, it is determined whether the installation destination can be selected in S106. When the installation destination selected, the process proceeds to S108. When the installation destination is not selected, the process proceeds to S109. In S108, the additional application is transferred to the installation destination ECU 100 selected in S106.

In S109, the server is notified of the result of installation, that is, whether the installation is successful or not, and the operation of the installation assignment application ends.

Figure 3:
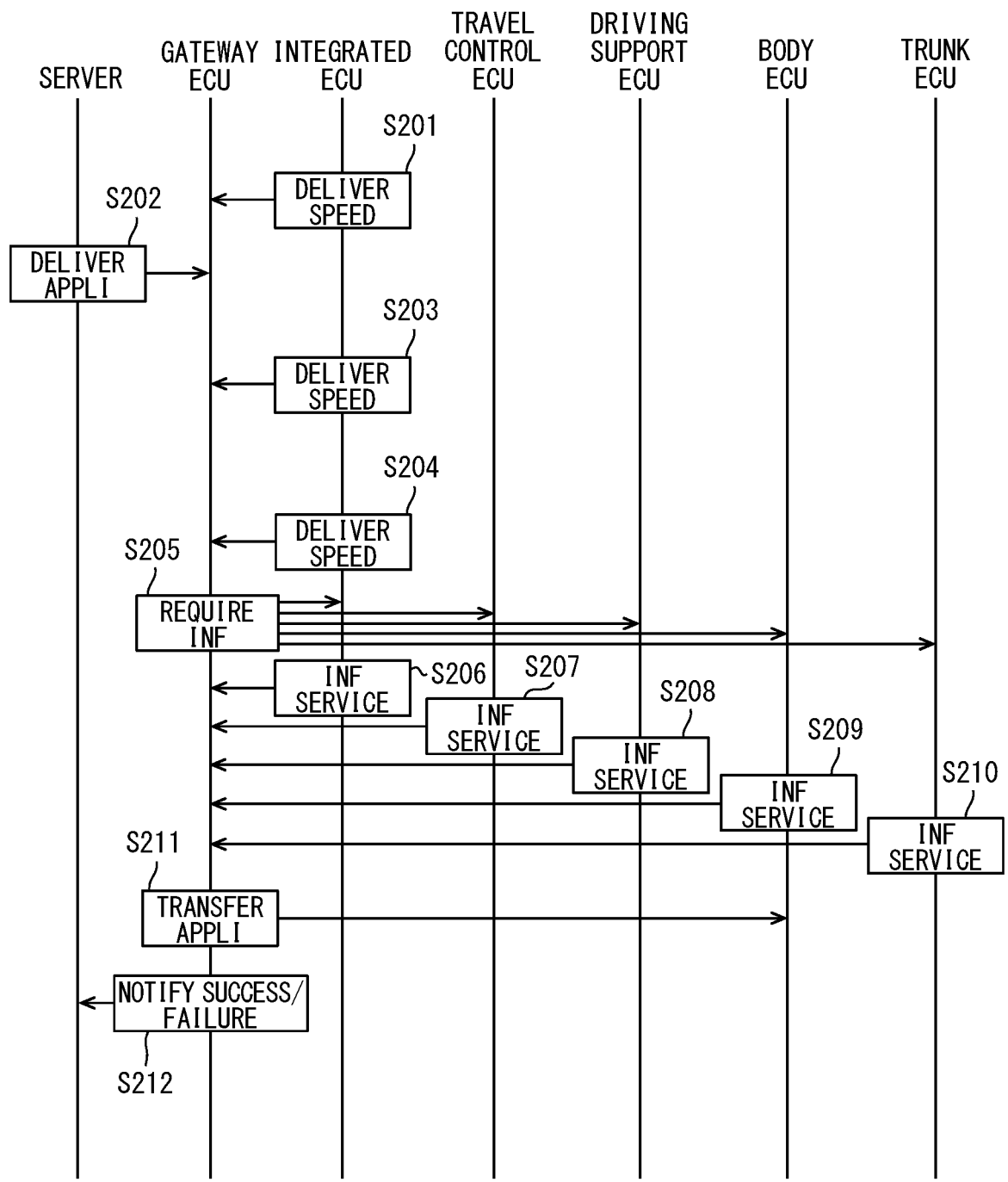
FIG. 3 is a sequence diagram showing a communication procedure of an installation assignment application.

A communication example for collecting resource information accompanying the operation of the installation assignment application is shown in the sequence diagram of FIG. 3. The gateway ECU 100f applies for the notification of the vehicle speed distribution service from the integrated ECU 100a in advance.

In S201, the integrated ECU 100a periodically distributes the speed to the gateway ECU 100f by applying in advance.

In S202, when the server device distributes the application to the gateway ECU 100f, the gateway ECU 100f starts the process related to the installation assignment application.

At S203, the integrated ECU 100a performs periodical delivery of the speed to the gateway ECU 100f again. By determining that the vehicle 1 is in the traveling state, the gateway ECU 100f stands by without requesting the resource information.

At S204, the integrated ECU 100a performs periodical delivery of the speed to the gateway ECU 100f again. The gateway ECU 100f requests each of the ECUs 100 to transmit the resource information at S205 by determining that the vehicle 1 is in the stop state.

Each of the ECUs 100 provides the resource information to the gateway ECU 100f in S206, S207, S208, S209, and S210.

The gateway ECU 100f that has selected the installation destination using the provision resource based on the received resource information transfers the application to the body ECU 100e in S211. At S212, the gateway ECU 100f notifies the server device of the successful installation.

[Activation of Additional Application]

Figure 4:
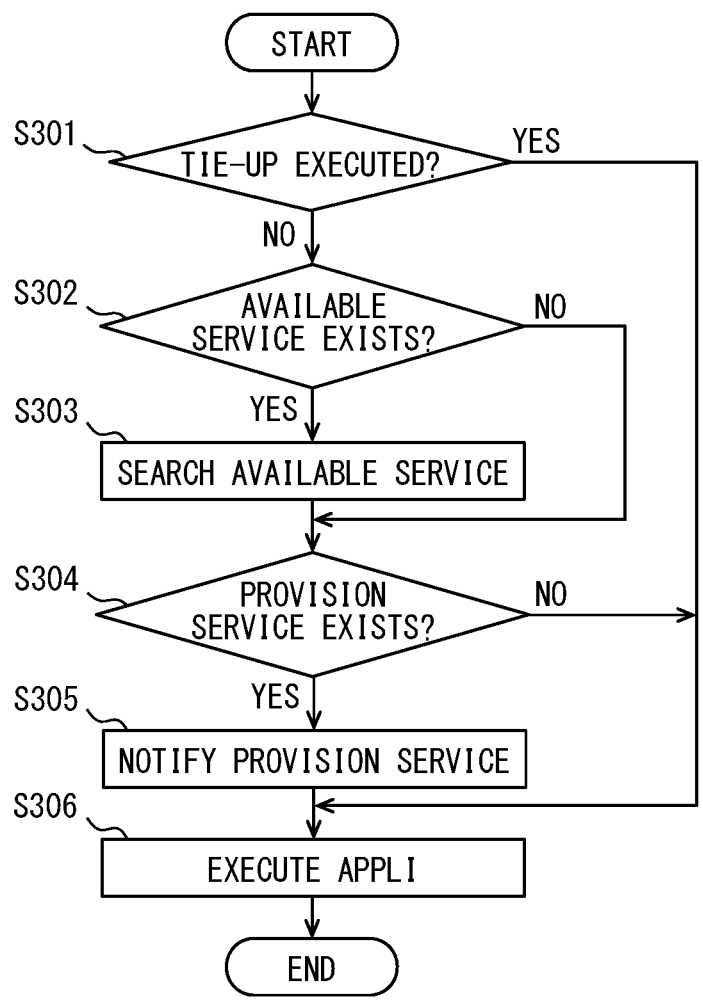
FIG. 4 is a flow chart showing an operation example of an additional application.

An operation example of the additional application installed in the selected ECU 100 will be described with reference to FIGS. 4 and 5. When the installed additional application is executed, the process shown in the flowchart of FIG. 4 is executed from S301.

In S301, it is determined whether the tie-up process with other services of the in-vehicle system 10 is completed, i.e., whether the mutual notification of the provided services is completed. When the process is completed, the process proceeds to step S306. When the process is not completed, the process proceeds to step S302.

In S302, it is determined whether there is a service to be used by the additional application, in other words, a service to be enjoyed in the additional application. When the service to be used exists, the process proceeds to step S303. If not, the process proceeds to step S304.

In S303, a search is made for the ECU 100 that provides the service to be used. Specifically, an inquiry is executed for each ECU 100 whether the service to be used is provided, and, when the service is provided, a reply is requested to each ECU 100.

In S304, it is determined whether there is a service provided by the additional application. When a service provided by the additional application exists, the process advances to step S305; and, if not, the process advances to step S306.

In S305, notification of the service provided by the additional application is performed. Specifically, an inquiry is performed for each ECU 100 whether the ECU requires using the service provided by the additional application. When the service to be provided is a delivery service, a request for reply in response to the application is also made. In S306, execution of the process concerning the function of the additional application is started.

Figure 5:
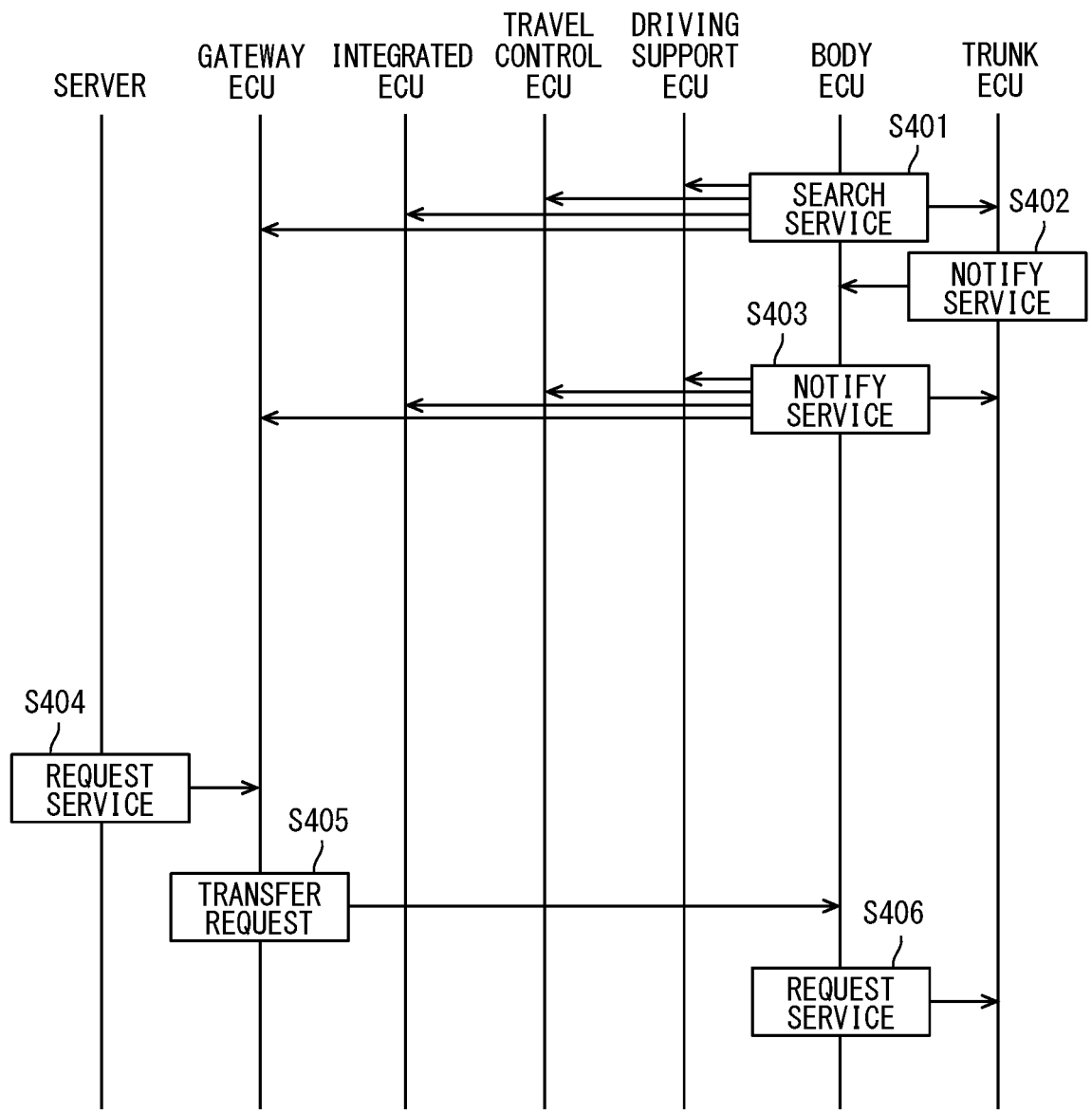
FIG. 5 is a sequence diagram showing a communication procedure of an additional application.

A communication example of the additional application is shown in the sequence diagram of FIG. 5. An example will be described in which the home delivery trunk application is installed as an additional application to the body ECU 100e.

In S401, the home delivery trunk application executed by the body ECU 100e searches for a service. The home delivery trunk application searches for a reception service of a lock and unlock command of the trunk room which is a service to be used.

In S402, the trunk ECU providing the reception service of the lock and unlock command of the trunk room sends a reply for notifying of the provision of the service.

In S403, the home delivery trunk application notifies each ECU of a service for receiving a home delivery trunk request command provided by itself.

In S404, the server device transmits a home delivery trunk request command to the gateway ECU 100f. At S405, the gateway ECU 100f notifies the body ECU 100e of the home delivery trunk request command received based on the service notification in S403.

In S406, the body ECU 100e transmits an unlock command of the trunk room to the trunk ECU 100d based on the provision destination of the reception service received in S402.

As described above, according to the embodiment described above, the request specifying unit 130 and the resource specifying unit 120 specify the request resource requested by the additional application and the provision resource that can be provided by each ECU. The selection unit 140 selects, from among the plurality of ECUs 100, the ECU 100 whose provision resource satisfies the request resource as the installation destination of the additional application. Therefore, the application installed in the selected ECU 100 is provided from the ECU 100 in which the request resource is installed and becomes operable. Therefore, the in-vehicle system 10 suppresses the performance degradation of the added application.

Further, in the present embodiment, the resource specifying unit 120 collects the resource information through communication with each ECU 100, and specifies a provision resource based on the collected resource information. Therefore, even when the provision resource of each ECU 100 changes with time, the resource specifying unit 120 can specify the changed provision resource. As a result, even when the provision resource of each ECU 100 changes with time, the selection unit 140 can select the ECU 100 whose provision resource satisfies the request resource as the installation destination. Therefore, the in-vehicle system 10 can further suppress the performance degradation of the added application.

Furthermore, in the present embodiment, when the operating state of the vehicle 1 is in the traveling state, the resource specifying unit 120 stops collection of resource information until the vehicle 1 is in the stopping state. Here, the network utilization rate in the in-vehicle system 10 and the utilization rates of the processor 101 and the memory 102 of each ECU 100 are expected to be smaller during the stopping state than during the traveling state of the vehicle. Therefore, according to the configuration in which the collection of the provision resources is waited until the vehicle 1 stops, the load generated on the network and each ECU 100 in the collection of provision resources is less likely to compete with the load related to other functions provided by the in-vehicle system 10. Therefore, the resource information can be collected while suppressing the performance degradation of the other functions provided by the in-vehicle system 10.

In addition, in the present embodiment, the resource specifying unit 120 distinguishes the operating state of the vehicle 1 and specifies the provision resource for each operating state. Further, the request specifying unit 130 specifies the operating state of the vehicle on which the additional application is to be executed. The selection unit 140 selects, as the installation destination, the ECU 100 in which the provision resource corresponding to the operation state, in which the additional application is executed, among the provision resources for the operation states satisfies the request resource. Therefore, even when the provision resource of each ECU 100 fluctuates according to the change in the operating state of the vehicle 1, the ECU 100 in which the provision resource satisfies the request resource is selected as the installation destination for the additional application. Therefore, the in-vehicle system 10 can further suppress the performance degradation of the added application.

<Other Embodiments>

Although the embodiments of the present disclosure have been described above, the present disclosure is not limited to the above-described embodiments, and the following modified examples are also included in the technical scope of the present disclosure, and furthermore, various changes can be made within the range that does not deviate from the scope. In the following description, elements having the same reference numerals as those used so far are the same as elements having the same reference numerals in the previous embodiments, except when specifically described. When only some parts of the configuration are described, the previously described embodiment may be applied to other parts of the configuration.

In the above embodiment, the gateway ECU 100f exhibits the function of selecting the installation destination of the application software such as the application acquisition unit 110, the request specifying unit 130, and the resource specifying unit 120. Alternatively, these functions may be exhibited in any of the ECUs 100 included in the in-vehicle system 10, or may be shared by a plurality of ECUs 100. Furthermore, even when any of the ECUs 100 exhibits functions, some or all of the functions may be configured by hardware.

In the above-described embodiment, the in-vehicle system 10 connects a plurality of ECUs related to functions as a group in a star configuration centering on the relay device 20, and connects each group by the connection of the relay devices 20. Alternatively, the network configuration of the in-vehicle system 10 and the functions of the ECUs 100 may not be limited to the above, and may be modified as appropriate. For example, the in-vehicle system 10 may have a network configuration in which the inside of a group is connected with centering on a so-called bus type configuration. The in-vehicle system 10 may adopt a configuration in which communication between groups is relayed not by the relay device 20 but by any one of the ECUs 100 in the group.

Furthermore, the in-vehicle system 10 may have a network configuration that provides a plurality of connection paths such as connection in a combination of a star form and a bus form between the respective ECUs. Alternatively, a configuration may be adopted such that an ECU partially exists to correspond to only the communication protocol for specifying the communication destination according to the fixed address and not to correspond to the service-oriented communication protocol on the network.

In the above-described embodiment, the resource specifying unit 120 specifies one provision resource for each ECU in each operation state. The resource provided in the state where the function of the existing application of each ECU is not limited is specified as a provision resource. Alternatively, when the existing application includes an application that permits restriction of its own function, it may be possible to specify the provision resource that is provided when the function is restricted. In such a case, the selection unit 140 is configured to select, as an installation destination, an ECU that satisfies the provision resource in the function-restricted state, when there is no ECU whose provision resource in the state not restricting the function satisfies the request resource.

In the above embodiment, the operating state of the vehicle 1 is divided into three states. Alternatively, the operating state of the vehicle 1 may not be divided, and may be divided into multiple states other than three states. For example, the traveling state may be further divided into a high-speed traveling state and a low-speed traveling state based on the vehicle speed and the like. Further, the criteria for determining the operating state of the vehicle may be changed as appropriate. For example, the determination whether the vehicle in the traveling state may be made based on the shift position, the operating conditions of the parking brake, or the like.

In the above-described embodiment, the resource specifying unit 120 collects resource information through communication with each ECU 100 to specify a provision resource. Alternatively, the resource specifying unit 120 may be configured to use the provision resource stored in advance in the storage 103 in the form of a table or the like as the provision resource of each ECU 100. For example, the resource specifying unit 120 may be configured to use the provision resource stored in the storage 103 in advance when referring to the provision resource which does not substantially change with time. The resource specifying unit 120 specifies the provision resource of each ECU 100 when the application acquisition unit 110 receives the additional application. Alternatively, the resource specifying unit may be configured to periodically specify the provision resource independently of the reception of the additional application.

In the above-described embodiment, common platform software is executed in each of the ECUs 100. Alternatively, as long as each ECU 100 can provide a function to be used by the additional application, the platform software may not be completely identical. For example, some of the ECUs 100 may utilize middleware not necessary for the additional application and not used in other ECUs 100. Alternatively, in some of the ECUs 100, the version of the operating system may be different from the other ECUs 100.

The in-vehicle system 10 may also include an ECU 100 that does not execute common platform software. For example, the ECU 100 included in the in-vehicle system 10 may be configured to realize a part of or all of the functions to be performed by one or more ICs as hardware.

In the above embodiment, the delivery trunk application is described as an additional application. Alternatively, the additional application may not be limited to the above application as long as the application is realized using the service defined by the communication protocol of the in-vehicle system 10. For example, it may be possible to install, as an additional application, a return home contact application that detects entry into a home peripheral area using a service providing the position of the vehicle 1, and transmits a notification message of home return to a home device.

In the above-described embodiment, the request specifying unit 130 specifies the minimum level of resources necessary for executing the additional application as the request resource based on information for identifying the execution environment attached to the installation file of the additional application. Alternatively, the format and the identification method of the request resource may not be limited to the above, and may be changed as appropriate. For example, the request resource may be set to only a policy in order of priority, such as selection of the ECU 100 having the largest available memory capacity, without specifying the minimum level. Alternatively, when the information for specifying the execution environment is not attached to the additional application, the request specifying unit 130 may adopt a configuration that uses a preset minimum level, a preset policy in order of priority, or the like as a request resource of the additional application.

The controllers and methods described in the present disclosure may be implemented by a special purpose computer created by configuring a memory and a processor programmed to execute one or more particular functions embodied in computer programs. Alternatively, the controllers and methods described in the present disclosure may be implemented by a special purpose computer created by configuring a processor provided by one or more special purpose hardware logic circuits. Alternatively, the controllers and methods described in the present disclosure may be implemented by one or more special purpose computers created by configuring a combination of a memory and a processor programmed to execute one or more particular functions and a processor provided by one or more hardware logic circuits. The computer programs may be stored, as instructions being executed by a computer, in a tangible non-transitory computer-readable medium.

It is noted that a flowchart or the processing of the flowchart in the present application includes sections (also referred to as steps), each of which is represented, for instance, as S101. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. An in-vehicle system for a vehicle comprising:
a plurality of information processors that install an application;
an application acquisition unit that acquires the application;
a request specifying unit that specifies a request resource required by the application acquired by the application acquisition unit;
a resource specifying unit that specifies a provision resource that is provided by each of the information processors; and
a selection unit that selects one of the information processors which provides the provision resource satisfying the request resource as an installation destination of the application, wherein:
the resource specifying unit collects resource information for calculating the provision resource via communication with each information processor, and specifies the provision resource based on collected resource information, and
the resource specifying unit waits for collecting the resource information until the vehicle stops when the vehicle is traveling.

2. An in-vehicle system for a vehicle comprising:
a plurality of information processors that install an application;
an application acquisition unit that acquires the application;
a request specifying unit that specifies a request resource required by the application acquired by the application acquisition unit;
a resource specifying unit that specifies a provision resource that is provided by each of the information processors; and
a selection unit that selects one of the information processors which provides the provision resource satisfying the request resource as an installation destination of the application, wherein:
the resource specifying unit collects resource information for calculating the provision resource via communication with each information processor, and specifies the provision resource based on collected resource information,
the resource specifying unit specifies the provision resource by distinguishing an operation state of the vehicle;
the request specifying unit specifies the operation state where execution of the application is expected; and
the selection unit selects the one of the information processors providing the provision resource that corresponds to the operation state where the execution is expected, and satisfies the request resource.

3. An in-vehicle system for a vehicle comprising:
a plurality of information processors that install an application; and
another processor configured to:
  acquire the application;
  specify a request resource required by the application acquired by the another processor;
  specify a provision resource that is provided by each of the information processors; and
  select one of the information processors which provides the provision resource satisfying the request resource as an installation destination of the application, wherein the another processor is further configured to:
collect resource information for calculating the provision resource via communication with each information processor, and specify the provision resource based on collected resource information, and
wait for collecting the resource information until the vehicle stops when the vehicle is traveling.

4. An in-vehicle system for a vehicle comprising:
a plurality of information processors that install an application; and
another processor configured to:
  acquire the application;
  specify a request resource required by the application acquired by the another processor;
  specify a provision resource that is provided by each of the information processors; and
select one of the information processors which provides the provision resource satisfying the request resource as an installation destination of the application, wherein the another processor is further configured to:
collect resource information for calculating the provision resource via communication with each information processor, and specify the provision resource based on collected resource information,
  specify the provision resource by distinguishing an operation state of the vehicle;
  specify the operation state where execution of the application is expected; and
  select the one of the information processors providing the provision resource that corresponds to the operation state where the execution is expected, and satisfies the request resource.

* * * * *